United States Patent
Yamamoto et al.

(10) Patent No.: US 7,767,264 B2
(45) Date of Patent: Aug. 3, 2010

(54) METHOD FOR PRODUCING RESIN SUBSTRATE COATED WITH TITANIC ACID FILM

(75) Inventors: Minoru Yamamoto, Tokushima (JP); Daisuke Suzuki, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 353 days.

(21) Appl. No.: 11/883,185

(22) PCT Filed: Jan. 26, 2006

(86) PCT No.: PCT/JP2006/301234
§ 371 (c)(1), (2), (4) Date: Jul. 27, 2007

(87) PCT Pub. No.: WO2006/080402
PCT Pub. Date: Aug. 3, 2006

(65) Prior Publication Data
US 2008/0171224 A1 Jul. 17, 2008

(30) Foreign Application Priority Data
Jan. 31, 2005 (JP) .............................. 2005-024386

(51) Int. Cl.
*B05D 3/02* (2006.01)
(52) U.S. Cl. .................................................. 427/372.2
(58) Field of Classification Search ........................ None
See application file for complete search history.

(56) References Cited

U.S. PATENT DOCUMENTS

| | | | |
|---|---|---|---|
| 5,863,514 A | 1/1999 | Sasaki et al. ................ | 423/609 |
| 6,677,041 B1 * | 1/2004 | Takahashi et al. ........... | 428/402 |
| 2002/0172828 A1 * | 11/2002 | Aki et al. .................... | 428/404 |
| 2003/0147804 A1 * | 8/2003 | Ogawa et al. ............... | 423/598 |
| 2004/0234447 A1 | 11/2004 | Inubushi et al. ............. | 423/598 |

FOREIGN PATENT DOCUMENTS

| | | |
|---|---|---|
| CN | 1543437 A | 11/2004 |
| EP | 1 419 994 A1 | 5/2004 |
| JP | 3-287634 | 12/1991 |
| JP | 2671949 B2 | 7/1997 |
| JP | 11-43646 A | 2/1999 |
| JP | 2979132 B2 | 9/1999 |
| JP | 3062497 B1 | 4/2000 |
| WO | 99/11574 A1 | 3/1999 |
| WO | 03/016218 A1 | 2/2003 |
| WO | 03/037797 A1 | 5/2003 |

OTHER PUBLICATIONS

Definition of titanic acid, Hawley's Condensed Chemical Dictionary, Twelfth Edition, 1993.*

* cited by examiner

*Primary Examiner*—Erma Cameron
(74) *Attorney, Agent, or Firm*—Kubovcik & Kubovcik

(57) ABSTRACT

A method for producing a resin substrate coated with a titanic acid film, characterized in that it comprises providing a suspension of a scaly titanic acid by treating a layered titanate with an acid or warm water and allowing a basic compound having a force swelling the interstice of the layer to act thereon, to swell or separate the layer, applying the suspension on a resin substrate, and subjecting the resultant substrate to a heat treatment at a temperature less than the softening temperature of said resin substrate, preferably at a temperature less than 100° C., to thereby form a titanic acid film on the resin substrate. The above method can be suitably used for forming an inorganic coating film excellent in transparency, surface hardness, gas-barrier property and the like on any type of resin substrate with good adhesion property.

9 Claims, No Drawings

METHOD FOR PRODUCING RESIN SUBSTRATE COATED WITH TITANIC ACID FILM

This application is a 371 of international application PCT/JP2006/301234 filed Jan. 26, 2006, which claims priority based on Japanese patent application No. 2005-024386 filed Jan. 31, 2005, which is incorporated herein by reference.

TECHNICAL FIELD

The present invention relates to a method for producing a resin substrate coated with a titanic acid film, in which the titanic acid film is formed on the resin substrate.

BACKGROUND ART

In recent years, plastic products have been gradually replacing glass or metal products in view of processability, weight reduction and others. However, plastic products have a problem of being susceptible to surface damage. In order to solve such a problem, methods have been proposed in which a plastic surface is covered with a film having a high surface hardness.

Patent Literature 1 proposes formation of a film of a (meth) acrylate ester copolymer on a surface of a polycarbonate product and succeeding formation thereon of a hardened film of a ladder silicone oligomer containing a silicone surfactant. Also, Patent Literature 2 proposes coating a hardened film of a silicone oligomer containing a colloidal silica onto a plastic substrate. However, these methods have problems of resulting in the failure to provide sufficient adhesion to a plastic substrate and sufficient surface hardness.

A silicon dioxide or other inorganic film can be formed on a plastic substrate such as by a method wherein a sol of silicon dioxide is applied onto the plastic substrate. This method however results in the insufficient adhesion. Also, the use of the plastic substrate prevents the applied film from being heated to a high temperature. This raises a problem of inability to form a film which is high in surface hardness or excellent in gas barrier property. There has been a further problem that the use of vaccum deposition or sputtering process results in the formation of a silicon dioxide or other inorganic film that is very brittle and insufficient in flexibility and adhesion, and also requires a special apparatus.

Also, application of an aqueous suspension of mont-morillonite onto a PET (polyethylene terephthalate) substrate is known to result in the formation of an inorganic film of montmorillonite on the PET substrate. However, the inorganic film such formed shows poor adhesion and insufficient surface hardness and gas barrier property. Also, the montmorillonite film can only be formed onto the PET substrate and can not be formed onto other resin substrates, which has been a further problem.

In Patent Literature 3, it is disclosed that a thin film is formed as a result of application onto a PET substrate of a suspension of a layered titanic acid obtained by treating a layered titanate with an acid and then allowing a basic compound to act on the resultant to effect swelling of spaces between layers or delamination of the layers. However, no study has been made for resin substrates other than the PET substrate. Also, no detailed discussions have been provided concerning thin film-forming conditions and properties of the thin film formed.

Patent Literatures 4-6 disclose production methods of a layered titanate, as will be described hereinafter. Patent Literatures 7 and 8 disclose production methods of a suspension of a lamellar titanic acid.

Patent Literature 1: Patent Laid-Open No. Hei 3-287634
Patent Literature 2: Patent Laid-Open No. Hei 11-43646
Patent Literature 3: International Publication No. WO 03/016218 pamphlet
Patent Literature 4: Patent Registration No. 2979132
Patent Literature 5: International Publication No. WO 99/11574 pamphlet
Patent Literature 6: Patent Registration No. 3062497
Patent Literature 7: Patent Registration No. 2671949
Patent Literature 8: International Publication No. WO 03/037797 pamphlet

DISCLOSURE OF THE INVENTION

An object of the present invention is concerned with a method for producing a resin substrate coated with a titanic acid film, which can form an inorganic film excellent in transparency, surface hardness, gas barrier property and the like on any type of resin substrate with good adhesion, and is also concerned with a titanic acid film-coated resin substrate produced by the method.

The method for producing a resin substrate coated with a titanic acid film, in accordance with the present invention, is characterized as comprising applying a suspension of a lamellar titanic acid onto a resin substrate and then subjecting them to a heat treatment at a temperature below a softening point of the resin substrate to thereby form a titanic acid film on the resin substrate.

In the production method of the present invention, subsequent to application of the suspension of lamellar titanic acid onto the resin substrate, the resultant substrate is preferably subjected to a heat treatment at a temperature of below 100° C. In the present invention, even if the resultant substrate is subjected to a heat treatment at a temperature of below 100° C., preferably within the range of 80-90° C., an inorganic film can be formed which comprises a titanic acid and has satisfactory transparency, surface hardness, gas barrier property and the like. As such, the heat treatment at a temperature of below 100° C. results in the formation of the titanic acid film with good adhesion. Therefore, the present invention enables formation of an adherent inorganic film onto almost all types of resin substrate.

The suspension of lamellar titanic acid, for use in the present invention, generally preferably has a pH of within the range of 6-12, more preferably within the range of 6-9. The use of the suspension having a pH of within the range of 6-9 prevents discoloration of the resulting titanic acid film when subjected to a weathering test and improves light stability thereof.

The lamellar titanic acid for use in the present invention preferably has a mean major length of 1-100 μm and a mean thickness of 0.5 nm-2 μm. The use of such lamellar titanic acid allows formation of the titanic acid film having a small and uniform thickness.

Preferably, the suspension of lamellar titanic acid, for use in the present invention, is the one which is obtained by treating a layered titanate with an acid or warm water and then allowing a basic compound to act on the resultant to thereby effect swelling of spaces between its layers or delamination thereof. In this case, it is more preferred that, after the basic compound is allowed to act on the resultant to thereby effect swelling of spaces between its layers or delamination the layers, the suspension of lamellar titanic acid is adjusted to a pH of within the range of 6-9 either by washing it with water to remove excess basic compound or by neutralizing excess basic compound with at least one acid selected from phosphoric acids, water-soluble carboxylic acid compounds, a boric acid and a carbonic acid gas.

The layered titanate is preferably represented by a general formula $A_xM_y\square_zTi_{2-(y+z)}O_4$ (in the formula, A and M are metals differing from each other and having a valence of 1-3, $\square$ represents a defect site of Ti, x is a positive real number and satisfies $0<x<1$, and y and z are independently 0 or a positive real number and satisfy $0<y+z<1$). As a specific example, the layered titanate may be represented by $K_{0.5-0.8}Li_{0.27}Ti_{1.73}O_{3.85-4}$.

The titanic acid film-coated resin substrate of the present invention is characterized as being produced by the production method of the present invention.

In accordance with the present invention, the inorganic film comprised of the titanate film excellent in transparency, surface hardness, gas barrier property and the like can be formed onto any type of resin substrate with good adhesion.

BEST MODE FOR CARRYING OUT THE INVENTION

The present invention is below described in detail.

(Suspension of Lamellar Titanic Acid)

The suspension of lamellar titanic acid, for use in the present invention, can be obtained, for example, by treating a layered titanate with an acid or warm water to obtain a layered titanic acid and then allowing a basic compound having an interlayer space swelling effect to act on the layered titanic acid to thereby effect swelling of spaces between its layers or delamination thereof. Such a method is described in Patent Literatures 3 and 7, for example.

(Layered Titanate)

The layered titanate, serving as a raw material, can be illustrated by $Cs_{0.7}Ti_{1.83}O_4$ which is obtained by mixing cesium carbonate and titanium dioxide at a ratio by mole of 1:5.3 and firing the mixture at 800° C., according to the method disclosed in Patent Literature 4. Another example is $K_{0.8}Li_{0.27}Ti_{1.73}O_4$ which is obtained by mixing potassium carbonate, lithium carbonate and titanium dioxide at a ratio of K/Li/Ti=3/1/6.5 (molar ratio), grinding and firing the mixture at 800° C., according to the method disclosed in Patent Literature 5. A further example is a layered titanate represented by a general formula $A_xM_y\square_zTi_{2-(y+z)}O_4$ (in the formula, A and M are metals differing from each other and having a valence of 1-3, $\square$ is a defective site of Ti, X is a positive real number satisfying $0<X<1.0$, and Y and Z are independently 0 or a positive real number satisfying $0<Y+Z<1.0$) which can be obtained by using an alkali metal, a halide or sulfate thereof as a flux, mixing this flux and a raw material at a flux/raw material ratio by weight of 0.1-2.0 and firing the mixture at 700-1,200° C., according to the method disclosed in Patent Literature 6. In the above general formula, A denotes a metal having a valence of 1-3, preferably at least one selected from K, Rb and Cs; M denotes a metal different from the metal A and having a valence of 1-3, preferably at least one selected from Li, Mg, Zn, Cu, Fe, Al, Ga, Mn and Ni. Specific examples of layered titanates include $K_{0.80}Li_{0.27}Ti_{1.73}O_4$, $Rb_{0.75}Ti_{1.75}Li_{0.25}O_4$, $Cs_{0.70}Li_{0.23}Ti_{1.77}O_4$, $Ce_{0.70}\square_{0.18}Ti_{1.83}O_4$, $Ce_{0.70}Mg_{0.35}Ti_{1.65}O_4$, $K_{0.8}Mg_{0.4}Ti_{1.6}O_4$, $K_{0.8}Ni_{0.4}Ti_{1.6}O_4$, $K_{0.8}Zn_{0.4}Ti_{1.6}O_4$, $K_{0.8}Cu_{0.4}Ti_{1.6}O_4$, $K_{0.8}Fe_{0.8}Ti_{1.2}O_4$, $K_{0.8}Mn_{0.8}Ti_{1.2}O_4$, $K_{0.76}Li_{0.22}Mg_{0.05}Ti_{1.73}O_4$ and $K_{0.67}Li_{0.2}Al_{10.07}Ti_{1.73}O_4$. A further useful example is $K_{0.5-0.7}Li_{0.27}Ti_{1.73}O_{3.85-3.95}$ which is obtained by washing $K_{0.8}Li_{0.27}Ti_{1.73}O_4$ with an acid, followed by firing, according to the method disclosed in Patent Literature 8.

(Layered Titanic Acid)

The layered titanic acid can be obtained by treating the above-described layered titanate with an acid to thereby substitute hydrogen ions and/or hydronium ions for exchangeable metal cations, for example. The acid for use in the acid treatment is not particularly specified and may be a mineral acid such as hydrochloric acid, sulfuric acid, nitric acid, phosphoric acid or boric acid, or organic acid. The type of the layered titanate, the type and concentration of the acid and the slurry concentration of the layered titanate all affect the percentage of exchange of the metal cations. In general, a lower acid concentration and a higher slurry concentration increase the amount of metal cations remaining between layers. This reduces the occurrence of delamination and accordingly increases a thickness of the lamellar titanic acid subsequent to delamination.

In the case where the metal cations are difficult to remove, the acid treatment may be repeated as necessary.

(Basic Compound Having Interlayer Space Swelling Effect)

The suspension of lamellar titanic acid is obtained by allowing a basic compound having an interlayer space swelling effect to act on the above-described layered titanic acid to effect swelling of spaces between its layers or delamination thereof. Examples of basic compounds having an interlayer space swelling effect include primary-tertiary amines and their salts, alkanolamines and their salts, quaternary ammonium salts, phosphonium salts, and amino acids and their salts. Examples of primary amines include methylamine, ethylamine, n-propylamine, butylamine, pentylamine, hexylamine, octyl-amine, dodecylamine, stearylamine, 2-ethylhexylamine, 3-methoxypropylamine, 3-ethoxypropylamine and their salts. Examples of secondary amines include diethylamine, dipentylamine, dioctylamine, dibenzylamine, di(2-ethyl-hexyl)amine, di(3-ethoxypropyl)amine and their salts. Examples of tertiary amines include triethylamine, tri-octylamine, tri(2-ethylhexyl)amine, tri(3-ethoxypropyl)amine, dipolyoxyethylene dodecylamine and their salts. Examples of alkanolamines include ethanolamine, diethanolamine, triethanolamine, isopropanolamine, diisopropanolamine, triisopropanolamine, N,N-dimethylethanolamine, 2-amino-2-methyl-1-propanol and their salts. Examples of hydroxyl quaternary ammonium salts include tetramethylammonium hydroxide, tetraethylammonium hydroxide, tetrapropylammonium hydroxide and tetrabutylammonium hydroxide. Examples of quaternary ammonium salts include dodecyltrimethylammonium salts, cetyltrimethylammonium salts, stearyltrimethyl-ammonium salts, benzyltrimethylammonium salts, benzyl-tributylammonium salts, trimethylphenylammonium salts, dimethyldistearylammonium salts, dimethyldidecylammonium salts, dimethylstearylbenzylammonium salts, dodecyl-bis(2-hydroxyethyl)methylammonium salts, trioctylmethylammonium salts and dipolyoxyethylenedodecylmethylammonium salts.

Examples of phosphonium salts include organic phosphonium salts such as tetrabutylphosphonium salts, hexadecyltributylphosphonium salts, dodecyltributyl-phosphonium salts and dodecyltriphenylphosphonium salts. Amines such as 12-aminododecanic acid and aminocaproic acid and their salts, and imines such as polyethylene imine and their salts are also useful.

These basic compounds may be used alone or in combination, depending on the particular purpose contemplated. Particularly, a highly hydrophobic basic compound is preferably used in combination with a highly hydrophilic basic compound, because the sole use of the former compound is not enough to induce sufficient progress of delamination.

For the effective action of the basic compound having an interlayer space swelling effect, the basic compound may be added under agitation, either directly or in the form of its dilute solution in an aqueous medium, to a suspension in which the layered titanic acid resulting from the acid or hot water treatment is dispersed in an aqueous medium. Alternatively, the layered titanic acid or its suspension may be added under agitation to an aqueous solution of the basic compound.

The aqueous medium or aqueous solution, as used above, refers to water, water-soluble solvents, mixed solvents of water and water-soluble solvents, and their solutions.

Examples of water-soluble solvents include alcohols such as methyl alcohol, ethyl alcohol and isopropyl alcohol; ketones such as acetone; ethers such as tetrahydrofuran and dioxane; nitrites such as acetonitrile; esters such as ethyl acetate and propylene carbonate; and the like.

The basic compound may preferably be added in the amount of 0.3-10 equivalents, more preferably 0.5-2 equivalents, of an ion exchange capacity of the layered titanate. The ion exchange capacity, as used herein, refers to the amount of exchangeable metal cations. In an exemplary case where the layered titanate is represented by the general formula $A_xM_y\square_zTi_{2-(y+z)}O_4$, the ion exchange capacity refers to a value given by mx+ny, wherein m and n denote respective valences of A and M.

The lamellar titanic acid preferably has a mean major length of 1-100 µm, more preferably 10-50 µm, and a mean thickness of 0.5 nm-2 µm, more preferably 1 nm-1 µm.

The mean major length of the lamellar titanic acid almost inherits that of the layered titanate as a raw material, so long as stirring with a high shear stress is not applied in the process where the basic compound is allowed to act on the layered titanic acid to effect delamination thereof.

If the mean major length of the lamellar titanic acid is below 1 µm, it becomes difficult to form a uniform coating film. If the mean major length exceeds 100 µm, it becomes difficult to synthesize the layered titanate as a raw material.

The mean thickness of the lamellar titanic acid when delaminated to monolayers is about 0.5 nm. If it increases to 2 µm or above, the suspension of lamellar titanic acid may fail to maintain its uniformly dispersed condition, possibly causing the lamellar titanic acid to settle out.

A concentration of the suspension of lamellar titanic acid is preferably 0.01-50% by weight, more preferably 0.1-10% by weight, in terms of a solids concentration of the lamellar titanic acid. If it is below 0.01% by weight, the resulting low viscosity makes it difficult to form the film. If it exceeds 50% by weight, handling becomes difficult due to the resulting high viscosity.

After the basic compound is allowed to act on the layered titanic acid to thereby effect swelling of spaces between its layers or delamination thereof, the resulting suspension of lamellar titanic acid generally shows a pH of within the range of 6-12. Preferably, the pH of the suspension of lamellar titanic acid is adjusted to fall within the range of 6-9 by washing it further with water to remove excess basic compound, or alternatively, neutralizing excess basic compound using at least one acid selected from phosphoric acids, water-soluble carboxylic acid compounds, a boric acid and a carbonic acid gas. The use of the suspension of lamellar titanic acid at a pH of within 6-9 improves light stability of the resulting titanic acid film. If the pH of the suspension of lamellar titanic acid falls below 6, the lamellar titanic acid may be caused to agglomerate and lose its dispersibility. Similarly, the use of mineral acids other than those specified above, such as hydrochloric acid and sulfuric acid, in neutralizing excess basic compound may increase the tendency of the lamellar titanic acid to agglomerate and lose its dispersibility.

In the case where the excess basic compound is removed by washing with water, the suspension of lamellar titanic acid may be centrifuged. After separation of a supernatant, the settled and concentrated dispersion of the lamellar titanic acid is subjected to redilution with deionized water, which operation may be repeated several times. Centrifuging may preferably be carried out under the conditions of 5,000-20,000 rpm and 5 minutes-1 hour.

In the case of neutralizing, at least one acid selected from phosphoric acids, water-soluble carboxylic compounds, a boric acid and a carbonic acid gas can be used. Examples of useful phosphoric acids include orthophosphoric acid, pyrophosphoric acid, metaphosphoric acid and polyphosphoric acid. Examples of useful water-soluble carboxylic compounds include formic acid, acetic acid, propionic acid, oxalic acid, malonic acid, glycolic acid, lactic acid and malic acid.

Also in the case of neutralizing, at least one acid selected from those specified above or its aqueous solution may be added to the suspension of lamellar titanic acid while it is stirred. Alternatively, a carbonic acid gas may be bubbled through the suspension. The salt produced via neutralization of the basic compound may preferably be removed such as by centrifugal cleaning.

(Resin Substrate)

The resin substrate for use in the present invention is not particularly specified. Specific examples of useful resins include sole resins such as polyolefin resins, acrylic resins, polyamide resins, polyurethane resins, polyester resins, polystyrene resins, polyacetal resins, polystyrene resins, polycarbonate resins, silicone resins, epoxy resins, melamine resins, cellulose resins, polyvinyl alcohol resins, urea resins, phenol resins, fluoro resins, polybutadiene resins; composite resins thereof; and the like.

(Formation of Titanic Acid Film)

In the present invention, the titanic acid film can be formed utilizing general methods including roll coating, gravure coating, knife coating, dip coating and spray coating.

The thickness of the titanic acid film is preferably 0.01-100 µm, more preferably 0.1-20 µm. If it is smaller than 0.01 µm, the expected effect may not be obtained. If it is larger than 100µm, a prolonged period is required for drying. Also, an economical disadvantage accompanies.

Although depending on the film thickness, the drying temperature is preferably 60° C. or higher, more preferably 80° C. or higher. If it is lower than 60° C., drying may become insufficient. An upper limit of the drying temperature is not particularly specified, so long as it is below a softening point of the substrate resin, but is preferably below 100° C.

Also, in the formation of the titanic acid film, a polymer, dispersant, surfactant, organic sol, inorganic sol or the like may be added to the suspension of lamellar titanic acid within the range that does not impair the intended purpose.

EXAMPLES

The present invention is now described specifically by way of examples and comparative examples but is not limited to the following examples. Wherever used hereinafter, "%" and "parts" are on a weight basis unless otherwise expressed.

(Synthesis of Suspension of Lamellar Titanic Acid)

Synthesis Example 1

27.64 g of potassium carbonate, 4.91 g of lithium carbonate and 69.23 g of titanium dioxide were dry ground and mixed to provide a raw material which was subsequently fired at 1,060° C. for 4 hours. After firing, the resulting sample was immersed in 10 kg of deionized water, stirred for 20 hours, separated, washed with water and dried at 110° C. This resulted in obtaining a white powder which was identified as a layered titanate $K_{0.80}Li_{0.27}Ti_{1.73}O_4$ with a mean major length of 32 μm.

65 g of this layered titanate was dispersed with stirring in 5 kg of 3.5% hydrochloric acid and reacted at 40° C. for 2 hours. Thereafter, the resultant was separated by suction filtration and washed with water to obtain a layered titanic acid. The amount of $K_2O$ remained in the layered titanic acid was 0.2% and the percentage of exchange of metal ions was 99.6%. The whole amount of this layered titanic acid obtained was dispersed in 1.6 Kg deionized water. Subsequently, a solution containing 22.7 g (1 equivalent) n-propylamine dissolved in 0.4 Kg deionized water was added with stirring thereto. Stirring was continued at 40° C. for 12 hours. The obtained suspension of lamellar titanic acid exhibited pH=11.5 and concentration of 2.7%. Although it was left at rest for a while, no solid matter was found to settle out. This was designated as a lamellar titanic acid suspension A. A mean major length was 31 μm and a mean thickness was 1 nm.

Synthesis Example 2

The procedure of Synthesis Example 1 was followed, except that the basic compound was changed to dimethylethanolamine, to prepare a lamellar titanic acid suspension B. The obtained lamellar titanic acid suspension exhibited pH=9.9 and concentration of 2.9%. Although it was left at rest for awhile, no solid matter was found to settle out. A mean major length was 31 μm and a mean thickness was 1 nm.

Synthesis Example 3

The procedure of Synthesis Example 1 was followed, except that the basic compound was changed to t-butylamine, to prepare a lamellar titanic acid suspension C. The obtained lamellar titanic acid suspension exhibited pH=10.3 and concentration of 2.7%. Although it was left at rest for a while, no solid matter was found to settle out. A mean major length was 31 μm and a mean thickness was 1 nm.

Synthesis Example 4

The procedure of Synthesis Example 1 was followed, except that the basic compound was changed to 2-methyl-2-amino-1-propanol, to prepare a lamellar titanic acid suspension D. The obtained lamellar titanic acid suspension exhibited pH=10.6 and concentration of 3.1%. Although it was left at rest for a while, no solid matter was found to settle out. A mean major length was 31 μm and a mean thickness was 1 nm.

Synthesis Example 5

79.2 liter of a 10.9% aqueous slurry of the layered titanate obtained in Synthesis Example 1 was prepared. 4.7 Kg of a 10% aqueous solution of sulfuric acid was added and stirred for 2 hours to adjust the slurry to a pH of 7.0. A sediment was separated, washed with water, dried at 110° C. and then fired at 600° C. for 12 hours. This resulted in obtaining a white powder which was identified as a layered titanate $K_{0.60}Li_{0.27}Ti_{1.73}O_{3.9}$ with a mean major length of 32 μm.

The procedure of Synthesis Example 1 was followed using the obtained layered titanate to prepare a lamellar titanic acid suspension E. The obtained lamellar titanic acid suspension exhibited pH=11.4 and concentration of 2.9%. Although it was left at rest for a while, no solid matter was found to settle out. A mean major length was 31 μm and a mean thickness was 1 nm.

Synthesis Example 6

27.64 g of potassium carbonate, 4.91 g of lithium carbonate, 69.23 g of titanium dioxide and 12.44 g of potassium chloride were dry ground and mixed to provide a raw material which was subsequently fired at 1,020° C. for 4 hours. After firing, the resulting sample was immersed in 10 kg deionized water, stirred for 20 hours, separated, washed with water and dried at 110° C. This resulted in obtaining a white powder which was identified as a layered titanate $K_{0.80}Li_{0.27}Ti_{1.73}O_4$ with a mean major length of 15 μm.

65 g of this layered titanate was dispersed with stirring in 5 Kg of 3.5% hydrochloric acid and reacted at 40° C. for 2 hours. Thereafter, the resultant was separated by suction filtration and washed with water. This operation was repeated twice to obtain a layered titanic acid. The amount of $K_2O$ remained in the layered titanic acid was 1.5% and the percentage of exchange of metal ions was 97.2%. The whole amount of this layered titanic acid obtained was dispersed in 1.6 Kg deionized water. Then, a solution containing 23.5 g (1 equivalent) ethanolamine dissolved in 0.4 Kg deionized water was added with stirring thereto. Stirring was continued at 40° C. for 12 hours to obtain a lamellar titanic acid suspension F. The obtained lamellar titanic acid suspension exhibited pH=11.1 and concentration of 2.8%. Although it was left at rest for a while, no solid matter was found to settle out. A mean major length was 14 μm and a mean thickness was 1 nm.

Synthesis Example 7

88.84 g of cesium carbonate and 69.23 g of titanium dioxide were dry ground and mixed to provide a raw material which was subsequently fired at 800° C. for 4 hours. After firing, the resulting sample was immersed in 10 kg of deionized water and stirred for 20 hours. Thereafter, a sediment was separated, washed with water and dried at 110° C. This resulted in obtaining a white powder which was identified as a layered titanate $Cs_{0.7}Ti_{1.83}O_4$ with a mean major length of 1 μm.

65 g of this layered titanate was dispersed with stirring in 5 Kg of 3.5% hydrochloric acid and reacted at 40° C. for 2 hours. Thereafter, the resultant was separated by suction filtration and washed with water. This operation was repeated three times to obtain a layered titanic acid. The percentage of exchange of metal ions thereof was 99.4%. The whole amount of this layered titanic acid obtained was dispersed in 1.6 Kg of deionized water. Subsequently, 1 Kg (1 equivalent) of a 10% aqueous solution of tetrabutyl ammonium hydroxide was added with stirring thereto. Stirring was continued at 40° C. for 12 hours to obtain a lamellar titanic acid suspension G. The obtained lamellar titanic acid suspension exhibited pH=9.5 and concentration of 2.5%. Although it was left at rest for awhile, no solid matter was found to settle out. A mean major length was 1 μm and a mean thickness was 1 nm.

Synthesis Example 8

The lamellar titanic acid suspension obtained in Synthesis Example 1 was centrifuged at 14,000 rpm for 20 minutes. After separation of a supernatant, the settled and concentrated dispersion of lamellar titanic acid was subjected to redilution with deionized water, which operation was repeated three times, to remove excess n-propylamine, along with a supernatant, and adjust the resultant to a concentration of 3.0%. The obtained lamellar titanic acid suspension H exhibited pH=8.4. Although it was left at rest for a while, no solid matter was found to settle out. A mean major length was 30 μm and a mean thickness was 1 nm.

Synthesis Example 9

A carbonic acid gas was bubbled through the lamellar titanic acid suspension obtained in Synthesis Example 1 to adjust it to a pH of 7.9, followed by centrifuging at 14,000 rpm for 20 minutes. After separation of a supernatant, the settled and concentrated dispersion of lamellar titanic acid was rediluted with deionized water to remove the produced n-propylamine carbonate, along with a supernatant, and adjust the resultant to a concentration of 3.0%. The obtained lamellar titanic acid suspension I exhibited pH=7.8. Although it was left at rest for a while, no solid matter was found to settle out. A mean major length was 30 μm and a mean thickness was 1 nm.

(Evaluation of Titanic Acid Film-Coated Resin Substrate)

Example 1

Each of the lamellar titanic acid suspensions A-I prepared in Synthesis Examples 1-9 was applied by a film applicator onto substrates comprised of the resins specified in Table 1 and dried at 80° C. for 10 minutes to form 2 μm thick titanic acid films. Successful film formation was evaluated as ○ and unsuccessful film formation was evaluated as x. The results are shown in Table 1.

Comparative Example 1

A 2.5 wt. % dispersion of natural montmorillonite (Kunipia F, product of Kunimine Industries, Co., Ltd.) in deionized water was applied onto the resin substrate specified in Table 1 to a film thickness of 2 μm. The results are also shown in Table 1.

TABLE 1

| | Example 1 Lamellar Titanic Acid Suspension | | | | | | | | | Comp. Example |
|---|---|---|---|---|---|---|---|---|---|---|
| | A | B | C | D | E | F | G | H | I | 1 |
| Polyethylene | ○ | ○ | ○ | ○ | ○ | ○ | ○ | ○ | ○ | X |
| Methyl Polymethacrylate | ○ | ○ | ○ | ○ | ○ | ○ | ○ | ○ | ○ | X |
| 6-nylon | ○ | ○ | ○ | ○ | ○ | ○ | ○ | ○ | ○ | X |
| Polyurethane | ○ | ○ | ○ | ○ | ○ | ○ | ○ | ○ | ○ | X |
| PET | ○ | ○ | ○ | ○ | ○ | ○ | ○ | ○ | ○ | ○ |
| Polyvinyl Acetate | ○ | ○ | ○ | ○ | ○ | ○ | ○ | ○ | ○ | X |
| Polystyrene | ○ | ○ | ○ | ○ | ○ | ○ | ○ | ○ | ○ | X |
| Polycarbonate | ○ | ○ | ○ | ○ | ○ | ○ | ○ | ○ | ○ | X |
| Polydimethylsiloxane | ○ | ○ | ○ | ○ | ○ | ○ | ○ | ○ | ○ | X |
| Epoxy Resin | ○ | ○ | ○ | ○ | ○ | ○ | ○ | ○ | ○ | X |

TABLE 1-continued

| | Example 1 Lamellar Titanic Acid Suspension | | | | | | | | | Comp. Example |
|---|---|---|---|---|---|---|---|---|---|---|
| | A | B | C | D | E | F | G | H | I | 1 |
| Melamine Resin | ○ | ○ | ○ | ○ | ○ | ○ | ○ | ○ | ○ | X |
| Polyurea | ○ | ○ | ○ | ○ | ○ | ○ | ○ | ○ | ○ | X |
| Phenol Resin | ○ | ○ | ○ | ○ | ○ | ○ | ○ | ○ | ○ | X |
| Polyvinylidene Fluoride | ○ | ○ | ○ | ○ | ○ | ○ | ○ | ○ | ○ | X |
| Cellophane | ○ | ○ | ○ | ○ | ○ | ○ | ○ | ○ | ○ | X |

As shown in Table 1, the use of the lamellar titanic acid suspensions A-I resulted in successful formation of titanic acid films on any one of the resin substrates.

Also, the titanic acid film-coated resin substrates were found to have sufficient adhesion as a coating film, as they when bent showed no signs of cracking or delamination of the inorganic films.

On the other hand, the montmorillonite dispersion (Comparative Example 1) could only form a film on the PET substrate and failed to form films on the other substrates due to repelling. Further, the montmorillonite film on the PET substrate showed almost no adhesion as a coating film, as it when bent was separated fully from the substrate.

Example 2

The procedure of Example 1 was followed to apply each of the lamellar titanic acid suspensions A-I onto a PET substrate (75 μm thick) and a polypropylene (PP) resin substrate (75 μm thick) to thereby form on each substrate a 2 μm thick titanic acid film whose transparency, pencil hardness and gas barrier property were subsequently evaluated according to the following procedures. The results are shown in Table 2.

[Transparency]

A total light ray transmittance of each titanic acid film was measured using a haze meter (NDH 2000, manufactured by Nippon Denshoku Industries, Co., Ltd.).

[Pencil Hardness]

A pencil hardness test was conducted according to JIS S-6006.

[Gas Barrier Property]

An oxygen gas barrier property (unit; $cc/m^2 \cdot day \cdot atm$) of each titanic acid film-coated resin substrate was measured using an oxygen transmission rate measuring apparatus (MO-CON, Inc. product, OX-TRAN2/61, temperature 35° C., humidity 60%)

Comparative Example 2

A montmorillonite film was formed on a PET substrate in the same manner as in Comparative Example 1 and its transparency, pencil hardness and oxygen barrier property were evaluated in the same manner as in Example 2. The results are also shown in Table 2.

TABLE 2

| Substrate Resin | Lamellar Titanic Acid Suspension | Transparency % | Pencil Hardness | Oxygen Gas Barrier Property |
|---|---|---|---|---|
| PET Resin Substrate | None | 90.2 | HB | 60 |
| | A | 86.8 | 3H | 4 |
| | B | 86.2 | 2H | 3 |
| | C | 84.3 | 3H | 5 |

TABLE 2-continued

| Substrate Resin | Lamellar Titanic Acid Suspension | Transparency % | Pencil Hardness | Oxygen Gas Barrier Property |
|---|---|---|---|---|
| | D | 85.3 | 3H | 4 |
| | E | 84.9 | 2H | 3 |
| | F | 84.1 | 2H | 4 |
| | G | 81.5 | H | 13 |
| | H | 86.4 | 3H | 2 |
| | I | 87.2 | 3H | 1 |
| | Comp. Ex. 2 | 65.2 | 5B | 58 |
| PP Resin Substrate | None | 88.7 | B | 3750 |
| | A | 83.2 | 2H | 8 |
| | B | 83.6 | H | 6 |
| | C | 83.7 | 2H | 6 |
| | D | 83.1 | 2H | 7 |
| | E | 83.1 | 2H | 7 |
| | F | 83.1 | 2H | 6 |
| | G | 81.9 | H | 18 |
| | H | 84.5 | 2H | 4 |
| | I | 84.9 | 2H | 2 |

As shown in Table 2, all the titanic acid films formed according to the present invention have been found to exhibit excellent transparency, surface hardness and gas barrier property.

On the other hand, the montmorillonite film on the PET substrate exhibited inferior physical properties in each category, compared to the titanic acid films formed according to the present invention.

Example 3

The procedure of Example 1 was followed to apply each of the lamellar titanic acid suspensions A, H and I onto a PET resin substrate to form thereon a titanic acid film. Its light stability was evaluated according to the following procedure. The results are shown in Table 3.

[Light Stability]

The titanic acid film-coated resin substrate was subjected to a 100-hour accelerated weathering test using a dew cycle sunshine weather meter WEL-SUN-DC (manufactured by Suga Test Instruments Co., Ltd., black panel temperature 60° C., 18-minute rainfall in every 120 minutes), where the light stability was evaluated by the amount in change of color difference ($\Delta E$) from an initial stage.

TABLE 3

| Lamellar Titanic Acid Suspension | $\Delta E$ |
|---|---|
| A | 4.3 |
| H | 1.1 |
| I | 0.8 |

As shown in Table 3, the titanic acid films formed from the lamellar titanic acid suspensions H and I have been found to show suppressed yellow discoloration and improved light stability, compared to the titanic acid film formed from the lamellar titanic acid suspension A.

The invention claimed is:

1. A method for producing a resin substrate coated with a titanic acid film characterized in that it comprises applying, onto a resin substrate, a suspension of a lamellar titanic acid obtained by treating a layered titanate with an acid or warm water to produce a layered titanic acid, allowing a basic compound having an interlayer space swelling effect to act on the layered titanic acid to thereby effect swelling of spaces between layers of the layered titanic acid or to effect delamination thereof, and (1) removing excess basic compound by washing with water, or (2) neutralizing excess basic compound with at least one acid selected from phosphoric acids, water-soluble carboxylic acid compounds, a boric acid and a carbonic acid gas; and subjecting the suspension of the lamellar titanic acid on the resin substrate to a heat treatment at a temperature of below a softening point of the resin substrate to thereby form a titanic acid film on the resin substrate.

2. The method for producing a resin substrate coated with a titanic acid film as recited in claim 1, characterized in that the heat treatment is carried out at a temperature of below 100° C.

3. The method for producing a resin substrate coated with a titanic acid film as recited in claim 1, characterized in that a pH of the suspension of lamellar titanic acid is within the range of 6-12.

4. The method for producing a resin substrate coated with a titanic acid film as recited in claim 1, characterized in that a pH of the suspension of lamellar titanic acid is within the range of 6-9.

5. The method for producing a resin substrate coated with a titanic acid film as recited in claim 1, characterized in that the lamellar titanic acid has a mean major length of 1-100 µm and a mean thickness of 0.5 nm-2 µm.

6. The method for producing a resin substrate coated with a titanic acid film as recited in claim 1, characterized in that the layered titanate is represented by a formula $A_x M_y \square_z Ti_{2-(y+z)} O_4$ (in the formula, A and M are metals differing from each other and having a valence of 1-3, $\square$ represents a defect site of Ti, x is a positive real number and satisfies 0<x<1, and y and z are independently 0 or a positive real number and satisfy 0<y+z<1.).

7. The method for producing a resin substrate coated with a titanic acid film as recited in claim 1, characterized in that the layered titanate is represented by $K_{0.5-0.8} Li_{0.27} Ti_{1.73} O_{3.85-4}$.

8. A resin substrate coated with a titanic acid film characterized in that it is produced by the method as recited in claim 1.

9. The resin substrate coated with a titanic acid film as recited in claim 8, characterized in that the resin substrate comprises a resin other than a PET resin.

* * * * *